US 11,746,277 B2

(12) United States Patent
Sawant et al.

(10) Patent No.: US 11,746,277 B2
(45) Date of Patent: *Sep. 5, 2023

(54) DILUTED CATIONIC FRICTION REDUCERS

(71) Applicant: ENERGY SOLUTIONS (US) LLC, Princeton, NJ (US)

(72) Inventors: Kailas Sawant, Mars, PA (US); Louis Villafane, Pittsburgh, PA (US); Kevin Frederick, Evans City, PA (US); Shih-Ruey Chen, Studio City, CA (US); Randy Loeffler, Carnegie, PA (US)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,044

(22) Filed: Sep. 30, 2021

(65) Prior Publication Data

US 2022/0017808 A1 Jan. 20, 2022

Related U.S. Application Data

(63) Continuation of application No. 15/755,113, filed as application No. PCT/US2016/048591 on Aug. 25, 2016, now Pat. No. 11,162,011.

(60) Provisional application No. 62/210,161, filed on Aug. 26, 2015.

(51) Int. Cl.
*C09K 8/64* (2006.01)
*C09K 8/36* (2006.01)
*C09K 8/82* (2006.01)
*C09K 8/72* (2006.01)

(52) U.S. Cl.
CPC .................. *C09K 8/36* (2013.01); *C09K 8/64* (2013.01); *C09K 8/725* (2013.01); *C09K 8/82* (2013.01); *C09K 2208/28* (2013.01)

(58) Field of Classification Search
CPC ........ C09K 2208/28; C09K 8/36; C09K 8/64; C09K 8/725; C09K 8/82
See application file for complete search history.

(56) References Cited

U.S. PATENT DOCUMENTS

| 4,147,681 | A | * | 4/1979 | Lim | C02F 1/54 |
| | | | | | 526/287 |
| 4,464,508 | A | * | 8/1984 | Easterly, Jr. | C08K 3/14 |
| | | | | | 524/801 |
| 7,004,254 | B1 | * | 2/2006 | Chatterji | C09K 8/68 |
| | | | | | 507/225 |
| 11,162,011 | B2 | * | 11/2021 | Sawant | C09K 8/725 |
| 2010/0307753 | A1 | * | 12/2010 | Rey | C09K 8/88 |
| | | | | | 166/305.1 |

* cited by examiner

*Primary Examiner* — Alicia Bland
(74) *Attorney, Agent, or Firm* — Osha Bergman Watanabe & Burton LLP

(57) ABSTRACT

A water-in-oil emulsion having an oil phase (O) and an aqueous phase (A) at an O/A ratio of from about 1:8 to about 10:1; wherein the water-in-oil emulsion includes the oil phase as a continuous phase that includes an inert hydrophobic liquid, and the aqueous phase as a dispersed phase of distinct particles in the oil phase that includes water, a water soluble polymer, and at least one surfactant; wherein the water soluble polymer includes from about 1 to about 60 weight percent of one or more cationic monomers, wherein the amount is by total weight of the water soluble polymer; wherein the water soluble polymer is present in an amount from about 5 to about 40 weight percent of the water-in-oil emulsion; and wherein an aqueous solution prepared by inverting the water-in-oil emulsion by adding it to water has at least comparable viscosity build to an aqueous solution made from a water-in-oil emulsion of the same composition containing 15 weight percent more water soluble polymer. Also provided is a method of treating a portion of a subterranean formation that includes the steps of: (a) providing a water-in-oil emulsion according to the present disclosure; (b) inverting the water-in-oil emulsion by adding it to water at from about 0.1 to about 5 gallons of water-in-oil emulsion per thousand gallons of water to form a friction reducing treatment solution containing from about 0.0005 weight percent to about 0.12 weight percent water soluble polymer based on the weight of the treatment solution; and (c) introducing the treatment solution into the portion of the subterranean formation.

9 Claims, No Drawings

DILUTED CATIONIC FRICTION REDUCERS

CROSS-REFERENCE TO RELATED APPLICATION

The present application is a continuation application, filed pursuant to 35 U.S.C. § 120, of U.S. patent application Ser. No. 15/755,113 filed on Feb. 26, 2018, which is a national stage entry of PCT/US2016/048591, filed on Aug. 25, 2016, which claims the benefit of priority under 35 U.S.C. § 119(e) of U.S. Provisional Application Ser. No. 62/210,161, filed on Aug. 26, 2015, the entire disclosure of which is incorporated herein by reference.

BACKGROUND

Friction reducers are typically high-molecular weight polymers of acrylamide in an oil external emulsion. They can be partially hydrolyzed and reacted with other chemicals to yield anionic or cationic products. They function to reduce friction pressures in all types of fluids from acids to hydrocarbons. Normal application in the field is about 1 to 3 gpt loading.

SUMMARY

The present disclosure provides a water-in-oil emulsion having an oil phase (O) and an aqueous phase (A) at an O/A ratio of from about 1:8 to about 10:1; wherein the water-in-oil emulsion includes the oil phase as a continuous phase that includes an inert hydrophobic liquid, and the aqueous phase as a dispersed phase of distinct particles in the oil phase that includes water, a water soluble polymer, and at least one surfactant; wherein the water soluble polymer includes from about 1 to about 60 weight percent of one or more cationic monomers, wherein the amount is by total weight of the water soluble polymer; wherein the water soluble polymer is present in an amount from about 5 to about 40 weight percent of the water-in-oil emulsion; and wherein an aqueous solution prepared by inverting the water-in-oil emulsion by adding it to water has at least comparable viscosity build to an aqueous solution made from a water-in-oil emulsion of the same composition containing 15 weight percent more water soluble polymer.

Also provided is a method of treating a portion of a subterranean formation that includes the steps of: (a) providing a water-in-oil emulsion according to the present disclosure; (b) inverting the water-in-oil emulsion by adding it to water at from about 0.1 to about 5 gallons of water-in-oil emulsion per thousand gallons of water to form a friction reducing treatment solution containing from about 0.0005 weight percent to about 0.12 weight percent water soluble polymer based on the weight of the treatment solution; and (c) introducing the treatment solution into the portion of the subterranean formation.

DETAILED DESCRIPTION

Surprisingly, the present subject matter provides similar or equivalent performance compared with known formulations having higher polymer loadings. This technology also provides additional benefits, such as reduced formation damage, "green" sustainable chemistry, and decreased operational costs.

Other than in the operating examples, or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass oligomer, and includes, without limitation, both homopolymers and copolymers.

As used herein, the term "copolymer," is not limited to polymers containing two types of monomeric units, but includes any combination of polymers, e.g., terpolymers, tetrapolymers, and the like.

The present invention provides a method of treating a portion of a subterranean formation that includes: providing a water-in-oil emulsion, inverting the water-in-oil emulsion to provide an aqueous treatment fluid that includes a polymer solution, and introducing the aqueous treatment fluid into the portion of the subterranean formation.

The aqueous treatment fluids of the present invention generally include water, and a friction reducing copolymer.

The water-in-oil emulsion includes an oil phase, an aqueous phase and at least one surfactant.

The oil phase (O) and the aqueous phase (A) can be present at an O/A ratio, based on the volume of each phase of from at least about 1:8, in some cases at least about 1:6 and in other cases at least about 1:4 and can be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio can be any ratio or range between any of the ratios recited above.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobil Corporation, Irving Tex., a narrow fraction of a branch-chain hydrocarbon available as KENSOL® 61 from Witco Chemical Company, New York, N.Y., mineral oil, available commercially as BLANDOL® from Witco, CALUME™ LVP-100 available from Calumet Specialty Products, Bumham, Ill., DRAKEOL® from Penreco Partnership, Houston, Tex., MAGIESOL® from Magie Bros., Oil City, Pa. and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 15% to about 80% by weight.

In embodiments of the invention, the inert hydrophobic liquid is present in the water-in-oil emulsion at a level of at least about 15, in some cases at least about 17.5, and in other cases at least about 20 weight percent based on the weight of the water-in-oil emulsion and can be present at up to about 80, in some cases up to about 60, in other cases up to about 40 and in some instances up to about 30 weight percent based on the weight of the water-in-oil emulsion. The total amount of inert hydrophobic liquid in the water-in-oil emulsion can be any value or can range between any of the values recited above.

Any suitable water-in-oil emulsifier can be used as the one or more surfactants used to make the water soluble polymer containing water-in-oil emulsion used in the present method. In embodiments of the invention, the surfactants include those having an HLB (hydrophilic-lipophilic balance) value between 2 and 10 in some cases between 3 and 9 and in other cases between 3 and 7.

As used herein, HLB is calculated using the art known method of calculating a value based on the chemical groups of the molecule. The method uses the following equation: $HLB=7+m*Hh+n*Hl$ where m represents the number of hydrophilic groups in the molecule, Hh represents the value of the hydrophilic groups, n represents the number of lipophilic groups in the molecule and Hl represents the value of the lipophilic groups.

Non-limiting examples of suitable surfactants include: fatty acid esters of mono-, di- and polyglycerols, for instance the monoleate, the dioleate, the monostearate, the distearate and the palmitostearate. These esters can be prepared, for example, by esterifying mono-, di- and polyglycerols, or mixtures of polyhydroxylated alcohols such as ethylene glycol, diethylene glycol, dipropylene glycol, 1,4-butanediol, 1,2,4-butanetriol, glycerol, trimethylolpropane, sorbitol, neopentyl glycol and pentaerythritol; fatty acid esters of sorbitan, for instance sorbitan monoleate, sorbitan dioleate, sorbitan trioleate, sorbitan monostearate and sorbitan tristearate; fatty acid esters of mannitol, for instance mannitol monolaurate or mannitol monopalmitate; fatty acid esters of pentaerythritol, for instance pentaerythritol monomyristate, pentaerythritol monopalmitate and pentaerythritol dipalmitate; fatty acid esters of polyethylene glycol sorbitan, more particularly the monooleates; fatty acid esters of polyethylene glycol mannitol, more particularly the monooleates and trioleates; fatty acid esters of glucose, for instance glucose monooleate and glucose monostearate; trimethylolpropane distearate; the products of reaction of isopropylamide with oleic acid; fatty acid esters of glycerol sorbitan; ethoxylated alkylamines; sodium hexadecyl phthalate; sodium decyl phthalate; and oil-soluble alkanolamides.

In particular embodiments of the invention, the surfactants can include ethoxylated nonionic surfactants, guerbet alcohol ethoxylate, and mixtures thereof. Specific examples include, but are not limited to tall oil fatty acid diethanolamine, such as those available as AMADOL® 511, from Akzo Nobel Surface Chemistry, Chicago, Ill.; polyoxyethylene (5) sorbitan monoleate, available as TWEEN® 81, from Uniqema, New Castle, Del.; sorbinate monoleate, available as SPAN® 80 from Uniquena, and ALKAMULS® SMO, from Rhone Poulenc, Inc., Paris, France.

The surfactants can be present at a level of at least about 0.1, in some instances at least about 0.25, in other instances at least about 0.5, in some cases at least about 0.75 and in other cases at least about 1 weight percent of the water-in-oil emulsion. When the amount of surfactants is too low, the aqueous phase may not be adequately dispersed in the oil phase and/or the water-in-oil emulsion may tend to separate into oil and aqueous phases. Also, the amount of surfactants can be up to about 7, in some cases up to about 5, and in other cases up to about 2.5 weight percent of the water-in-oil emulsion. The amount of surfactants in the water-in-oil emulsion can be any value or can range between any of the values recited above.

The aqueous phase is a dispersed phase of distinct particles in the oil phase and includes water and a water soluble polymer. The aqueous phase in total can be present in the present water-in-oil emulsion polymer composition at a level of at least about 65, in some cases at least about 67.5, and in other cases at least about 70 weight percent based on the weight of the water-in-oil emulsion and can be present at up to about 85, in some cases up to about 82.5, in other cases up to about 80 and in some instances up to about 77.5 weight percent based on the weight of the water-in-oil emulsion. The total amount of aqueous phase in the water-in-oil emulsion can be any value or can range between any of the values recited above.

In the present invention, the water soluble polymer is present at a level of at least about 10, in some cases at least about 12.5, and in other cases at least about 15 weight percent based on the weight of the water-in-oil emulsion and can be present at up to about 25, in some cases up to about 22, in other cases up to about 21 and in some instances up to about 20 weight percent based on the weight of the water-in-oil emulsion. When the amount of water soluble polymer is too low, the use of the water-in-oil emulsion in the present method of treating a portion of a subterranean formation may be uneconomical. When the amount of water soluble polymer is too high, the performance of the water soluble polymer in the present method of treating a portion of a subterranean formation may be less than optimum. The amount of water soluble polymer in the aqueous phase of the water-in-oil emulsion can be any value or can range between any of the values recited above.

In some embodiments of the invention, the water soluble polymer can be present at a level of at least about 10, in some cases at least about 15, and in other cases at least about 20 weight percent based on the weight of the water-in-oil emulsion and can be present at up to about 35 and in some cases up to about 30 weight percent based on the weight of the water-in-oil emulsion. In these embodiments, the amount of water soluble polymer in the aqueous treatment fluid is typically less than about 0.01%, based on the weight of the aqueous treatment fluid.

Not being limited to any single theory, it is believed that the water-in-oil emulsion used in the present method is able to release the water soluble polymer from the water-in-oil emulsion into the aqueous treatment fluid more effectively and more efficiently than prior art methods. Prior art methods typically require using a water-in-oil emulsion containing a water soluble polymer at levels of 30 weight percent or more. These water soluble polymers are very high molecular weight and the individual polymer molecules are highly entangled and intertwined and do not easily disentangle and or separate from each other when added to make up water. This problem is overcome in the present invention, as the lower amount of water soluble polymers in the dispersed aqueous phase particles of the present water-in-oil emulsion provide for less entangling and intertwining of the individual polymer molecules and more rapid make dissolution, and therefore viscosity build during make clown to form the aqueous treatment fluid. The resulting improved make clown of the individual polymer molecules provides a more efficient and effective friction reducing treatment solution by allowing the polymer molecules to more readily disperse, separate and expand in water, which results in more viscosity build and more of a friction reducing effect.

The water-in-oil emulsion of the present invention can be made clown into a 2 wt % aqueous solution of the inverted water-in-oil emulsion. The bulk viscosity of the solution can be measured at 25° C. using a Brookfield RV instrument equipped with an appropriate spindle at 10 rpm at 25° C. (Brookfield Engineering Laboratories, Inc., Middleboro, Mass.).

Thus, the water soluble polymers in the dispersed aqueous phase particles of the present water-in-oil emulsion are able to provide a greater friction reducing effect by reducing the energy losses due to friction in the aqueous treatment fluids of the present invention. As a non-limiting example, the water soluble polymers of the present invention can reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

The water-in-oil emulsion containing the water soluble polymer of the present method is prepared using water-in-oil emulsion polymerization techniques. Suitable methods to effect such polymerizations are known in the art, non-limiting examples of such being disclosed in U.S. Pat. Nos. 3,284,393; 4,024,097; 4,059,552; 4,419,344; 4,713,431; 4,772,659; 4,672,090; 5,292,800; and 6,825,301, the relevant disclosures of which are incorporated herein by reference.

Typically, the water-in-oil polymerization is carried out by mixing the surfactants with the oil phase, which contains the inert hydrophobic liquid. The aqueous phase is then prepared combining a monomer mixture with water in the desired concentration. Additionally, a chelant, such as a sodium salt of ethylenediaminetetraacetic acid (EDTA) can optionally be added to the aqueous phase and the pH of the aqueous phase can be adjusted to 3.0 to 10.0, depending on the particular monomer(s) in the monomer mixture. The aqueous phase is then added to the mixture of oil phase and surfactants. The surfactants enable the aqueous phase, which contains the monomer mixture, to be emulsified into and form discrete particles in the oil phase. Polymerization is then carried out in the presence of a free radical generating initiator.

Any suitable initiator can be used. Non-limiting examples of suitable initiators include diethyl 2,2'-azobisisobutyrate, dimethyl 2,2'-azobisisobutyrate, 2-methyl 2'-ethyl azobisisobutyrate, benzoyl peroxide, lauroyl peroxide, sodium persulfate, potassium persulfate, tert-butyl hydroperoxide, dimethane sulfonyl peroxide, ammonium persulfate, azobisisobutylonitrile, dimethyl 2,2'-azobis(isobutyrate) and combinations thereof.

The amount of initiator can be from about 0.01 to 1% by weight of the monomer mixture, in some cases from 0.02% to 0.5% by weight of the monomer mixture.

In some embodiments of the invention, the polymerization technique may have an initiation temperature of about 25° C. and proceed approximately adiabatically. In other embodiments of the invention, the polymerization can be carried out isothermally at a temperature of about from 37° C. to about 50° C.

Typically, the composition of the water soluble polymer will be the same or about the same as the composition of the monomer mixture.

In certain embodiments, the monomer mixture includes from about 1 to about 60 weight percent of one or more cationic monomers. In other embodiments, the monomer mixture includes from about 1 to about 40 weight percent of one or more cationic monomers. In other embodiments, the monomer mixture includes from about 1 to about 30 weight percent of one or more cationic monomers. All amounts are by total weight of the monomer mixture.

In certain embodiments, the cationic monomer is selected from (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, dimethylaminoethylmethacrylate, and dimethylaminopropylmethacrylamide. In other embodiments, the (meth)acrylamidopropyltrimethyl ammonium halide is (meth)acrylamidopropyltrimethyl ammonium chloride ("MAPTAC"). In other embodiments, the (meth)acryloyloxyethyltrimethyl ammonium halide is acryloyloxyethyltrimethyl ammonium chloride ("AETAC"). In other embodiments, the diallyl dimethyl ammonium halide is diallyl dimethyl ammonium chloride ("DADMAC").

Optionally, the water soluble polymer can include other monomers to provide desirable properties to the polymer. Non-limiting examples of suitable other monomers that can be included in the monomer mixture, and ultimately the resulting water soluble polymer include non-ionic monomers. Non-limiting examples of non-ionic monomers include acrylamides and acrylates. A non-limiting example of an acrylamide is N-(1,1,3,3-tetramethylbutyl)acrylamide. Non-limiting examples of acrylates include N,N-dimethyl acrylate and hydroxypropyl methyl acrylate.

In certain embodiments, acrylamide is present in an amount from amount from about 10 to about 99 weight percent. In other embodiments, acrylamide is present in an amount from amount from about 10 to about 60 weight percent. In other embodiments, acrylamide is present in an amount from about 10 to about 40 weight percent. In a particular embodiment, the monomer mixture includes acrylamide in an amount from about 40 to about 60 weight percent and at least one cationic monomer in an amount from about 40 to about 60 weight percent. All amounts are by total weight of the monomer mixture.

In some embodiments, the oil-in-water emulsion can include a salt. Among other things, the salt can be present to add stability to the emulsion and/or reduced viscosity of the emulsion. Examples of suitable salts, include, but are not limited to, ammonium chloride, potassium chloride, sodium chloride, ammonium sulfate, and mixtures thereof. In some embodiments, the salt can be present in emulsions in an amount in the range of from about 0.5% to about 2.5% by weight of the emulsion.

In some embodiments, the oil-in-water emulsions can include an inhibitor. Among other things, the inhibitor can be included to prevent premature polymerization of the monomers prior to initiation of the emulsion polymerization reaction. As those of ordinary skill in the art will appreciate, with the benefit of this disclosure, the water soluble polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

The water soluble polymers of the present invention typically have a molecular weight sufficient to provide a desired level of friction reduction. Generally, friction reducing polymers have a higher molecular weight in order to provide a desirable level of friction reduction. As a non-limiting example, the weight average molecular weight of the friction reducing copolymers may be in the range of from about 1,000,000 to about 20,000,000, as determined using intrinsic viscosities. Those of ordinary skill in the art will recognize that friction reducing copolymers having molecular weights outside the listed range may still provide some degree of friction reduction in an aqueous treatment fluid.

As used herein, intrinsic viscosity is determined using a Ubbelohde Capillary Viscometer and solutions of the water soluble polymer in 1 M NaCl solution, at 30° C., and pH 7 at 0.05 wt. %, 0.025 wt. % and 0.01 wt. % and extrapolating the measured values to zero concentration to determine the intrinsic viscosity. The molecular weight of the water soluble polymer is then determined using the Mark-Houwink equation as is known in the art.

Alternatively, the reduced viscosity of the water soluble polymer at 0.05 wt. % concentration is used to measure molecular size. As such, the water soluble polymer has a reduced viscosity, as determined in an Ubbelohde Capillary Viscometer at 0.05% by weight concentration of the polymer in 1 M NaCl solution, at 30° C., pH 7, of from about 10 to about 40 dl/g, in some cases from 15 to about 35 dl/g, and in other cases 15 to about 30 dl/g.

The water-in-oil emulsion is added to water by inverting the emulsion to forma friction reducing treatment solution. As used herein, the terms "invert" and/or "inverting" refer to exposing the water-in-oil emulsion to conditions that cause the aqueous phase to become the continuous phase. This inversion releases the water soluble polymer into the make up water.

Methods of inverting water soluble polymer containing water-in-oil emulsions are known in the art and are disclosed, as a non-limiting example in U.S. Pat. No. 3,624,019.

In embodiments of the invention, in order to aid the inversion, make clown and dissolution of the water soluble polymer, an inverting surfactant can be included in the water-in-oil emulsion. Among other things, the inverting surfactant can facilitate the inverting of the emulsion upon addition to make up water and/or the aqueous treatment fluids of the present invention. As those of ordinary skill in the art will appreciate, with the benefit of this disclosure, upon addition to the aqueous treatment fluid, the water-in-oil emulsion should invert, releasing the copolymer into the aqueous treatment fluid.

Non-limiting examples of suitable inverting surfactants include, polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, and sorbitol-anhydride).

In particular embodiments of the invention, the inverting surfactants can include ethoxylated nonyl phenols, ethoxylated nonyl phenol formaldehyde resins, ethoxylated alcohols, nonionic surfactants with an HLB of from 12 to 14, and mixtures thereof.

A specific non-limiting example of a suitable inverting surfactant includes an ethoxylated $C_{12}C_{16}$ alcohol. The inverting surfactant can be present in an amount sufficient to provide the desired inversion of the emulsion upon contact with the water in the aqueous treatment fluid. In some embodiments, the inverting surfactant can be present in an amount in the range of from about 1% to about 5%, in some cases from about 1.5% to about 3.5% by weight of the water-in-oil emulsion.

In many embodiments of the invention, the inverting surfactants are added to the water-in-oil emulsion after the polymerization is completed.

In some embodiments of the invention, a batch method can be used to make clown the water-in-oil emulsion. In this embodiment, the water soluble polymer containing water-in-oil emulsion and water are delivered to a common mixing tank. Once in the tank, the solution is beat or mixed for a specific length of time in order to impart energy thereto. After mixing, the resulting solution must age to allow enough time for the molecules to unwind. This period of time is significantly reduced in the present invention.

In other embodiments of the invention, continuous in-line mixers as well as in-line static mixers can be used to combine the water soluble polymer containing water-in-oil emulsion and water. Non-limiting examples of suitable mixers utilized for mixing and feeding are disclosed in U.S. Pat. Nos. 4,522,502; 4,642,222; 4,747,691; and 5,470,150. Non-limiting examples of suitable static mixers can be found in U.S. Pat. Nos. 4,051,065 and 3,067,987.

Once the water soluble polymer containing water-in-oil emulsion is made clown into water, any other additives are added to the solution to forma treatment solution, which is then introduced into the portion of the subterranean formation.

Generally, the water soluble polymer of the present invention can be included in any aqueous treatment fluid used in subterranean treatments to reduce friction. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

The water used in the aqueous treatment fluids of the present invention can be freshwater, saltwater (e.g., water containing one or more salts dissolved therein), brine (e.g., produced from subterranean formations), seawater, pit water, pond water—or—the like, or combinations thereof. Generally, the water used may be from any source, provided that it does not contain an excess of compounds that may adversely affect other components in the aqueous treatment fluid or the formation itself. The present invention is effective in all aqueous treating fluid waters.

The water soluble polymers of the present invention should be included in the aqueous treatment fluids of the present invention in an amount sufficient to provide the desired reduction of friction. In some embodiments, a water soluble polymer of the present invention may be present in an amount that is at least about 0.0025%, in some cases at least about 0.003%, in other cases at least about 0.0035% and in some instances at least about 0.05% by weight of the aqueous treatment fluid and can be up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous treatment fluid. The amount of the water soluble polymers included in the aqueous treatment fluids can be any value or range between any of the values recited above.

In some embodiments, the water soluble polymer of the present invention can be present in aqueous treatment fluids in an amount in the range of from about 0.0025% to about 0.025%, in some cases in the range of from about 0.0025% to less than about 0.01%, in other cases in the range of from about 0.0025% to about 0.009%, and in some situations in the range of from about 0.0025% to about 0.008%, by weight of the aqueous treatment fluid.

In embodiments of the invention, when the present water-in-oil emulsions are used, the amount of water soluble polymer in the aqueous treatment fluid can be at least about 5%, in some cases at least about 7.5%, in other cases at least about 10%, in some instances at least about 12.5%, in other instances at least about 15%, in some situations at least about 20%, and in other situations at least about 25% less than when water-in-oil emulsion containing a polymer of the same composition at a concentration of 30 weight percent or more are used in the in the aqueous treatment fluid.

In embodiments of the invention, the water-in-oil emulsions according to the invention are used in the friction reducing treatment solution in an amount of at least about 0.1 gallons of water-in-oil emulsion per thousand gallons of aqueous treating fluid water (gpt), in some cases at least about 0.15 gpt, and in other cases at least about 0.2 gpt and can be up to about 2 gpt, in some cases up to about 1.75 gpt, in other cases up to about 1.5 gpt, in some instances up to about 1.25 gpt, and in other instances up to about 1.1 gpt. The amount of water-in-oil emulsion used in the friction reducing treatment solution can be any value or range between any of the values recited above.

The lower polymer usage when the present invention is used results in significantly decreased formation damage, decreased flocculation in above ground fluid recycle operations, and is more environmentally friendly as lower levels of polymer are used. Additionally, the lower polymer dose can be delivered using existing equipment resulting in better performance with little or no capital cost requirement.

Additional additives can be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

The aqueous treatment fluids of the present invention can be used in any subterranean treatment where the reduction of friction is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where friction reduction may be desired.

In some embodiments, the present invention provides a method of treating a portion of a subterranean formation that includes providing the above-described aqueous treatment fluid and introducing the aqueous treatment fluid into the portion of the subterranean formation. In some embodiments, the aqueous treatment fluid can be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

The methods of the present invention can also include preparing the aqueous treatment fluid. Preparing the aqueous treatment fluid can include providing the water soluble polymer containing water-in-oil emulsion and combining the water soluble polymer with the water to from the aqueous treatment fluid.

The present disclosure will further be described by reference to the following examples. The following examples are merely illustrative and are not intended to be limiting. Unless otherwise indicated, all percentages are by weight of the total composition.

Example 1

Preparation of Water-in-Oil Emulsion Polymers (25% active).

The ingredients in the aqueous monomer phase, oil phase, and surfactants (expressed in weight percentage of the total water-in-oil emulsion composition) used are shown in Table 1. Preparation typically included combining some or all of deionized water, acrylamide (AM), methacrylamidopropyltrimethylammonium chloride (MAPTAC), diallyldimethylammonium chloride (DADMAC), acryloyloxyethyl trimethyl ammonium chloride (AETAC), $NH_4Cl$, EDTA, $H_2SO_4$ and mixing until homogenous to form the aqueous phase. The oil phase was prepared by mixing hydrophobic liquid with the indicated surfactants and stirring until blended. The pH of the aqueous phase was adjusted and it was then added to the oil phase and stirred to form a dispersion.

The dispersion was stirred under a nitrogen purge for 30 minutes and heated to the appropriate initiation temperature. At this stage, 20 microliters of peroxide was added to the reaction vessel followed by 0.075% sodium metabisulfite (SMBS) being fed at 0.1 mL/min. Upon initiation of exotherm, the reaction temperature was allowed to reach 50 degrees Celsius and controlled between 48-50° C. for the remainder of the exotherm. The feed rate of the SMBS was then increased to 1 mL/min followed by addition of a 34.71% SMBS scavenger at 1 mL/min. An inverting surfactant was blended into the emulsion and the polymer was cooled to room temperature.

10% or 18.5% active.

The ingredients in the aqueous monomer phase, oil phase, and surfactants (expressed in weight percentage of the total remainder of the exotherm. The feed rate of the SMBS was then increased to 1 mL/min followed by addition of a 34.71% SMBS scavenger at 1 mL/min.

A dilution phase was prepared by mixing an oil phase, hydrophobic liquid and indicated surfactants, with a NaCl and deionized water solution. The oil phase was stirred and the brine solution added and mixed for 15 minutes. The required amount of the dilution phase was added to the base, as prepared above, and mixed 30 min at 30° C. Appropriate inverting surfactant was blended into the emulsion and the polymer was then cooled to room temperature.

TABLE 1

Components for Preparation of Water-in-Oil Emulsion Polymers.

| 40/30/30 AM/AETAC/DADMAC | | | 60/10/10/20 AM/AETAC/MAPTAC/DADMAC | | |
|---|---|---|---|---|---|
| | 25% Active | 10% Active | | 25% Active | 10% Active |
| Aliphatic Hydrocarbons | 20.4893 | 20.7038 | Aliphatic Hydrocarbons | 20.5275 | 20.7187 |
| Ethoxylated Amine | 1.5008 | 1.5056 | Ethoxylated Amine | 1.5001 | 1.5053 |
| Alkoxylate | 0.5003 | 0.5090 0.0000 | Alkoxylate | 0.5000 | 0.5089 |
| Acrylamide (50 wt %) | 20.0104 | 7.9387 | Acrylamide (50 wt %) | 30.0012 | 11.9022 |
| $H_2O$ | 10.3120 | 4.0911 | $H_2O$ | 5.4869 | 2.1768 |
| $NH_4Cl$ | 0.8738 | 0.3467 | $NH_4Cl$ | 0.8734 | 0.3465 |
| Brine (26.4 wt %) | 22.4917 | 54.8869 | Brine (26.4 wt %) | 22.4876 | 54.8845 |
| AETAC (80 wt) | 9.3782 | 3.7206 | AETAC (80 wt %) | 3.1268 | 1.2405 |
| DADMAC (63.4 wt %) | 11.8328 | 4.6944 | MAPTAC (50 wt %) | 5.0002 | 1.9837 |
| $Na_4EDTA$ | 0.0133 | 0.0053 | DADMAC (63.4 wt %) | 7.8870 | 3.1290 |
| | | | $Na_4EDTA$ | 0.0133 | 0.0053 |
| SMBS Solution (0.15%) | 1.6208 | 0.6430 | SMES Solution (0.15%) | 1.6201 | 0.6427 |
| Peroxide | 0.0027 | 0.0011 | Peroxide | 0.0027 | 0.0011 |
| Inverting Surfactant | 0.9738 | 0.9543 | Inverting Surfactant | 0.9734 | 0.9543 |
| Total | 100.0000 | 100.0005 | | 100.0000 | 99.9993 |

| 60/40 AM/AETAC | |
|---|---|
| | 18.5% Active |
| Aliphatic Hydrocarbons | 16.5886 |
| Ethoxylated Amine | 1.4849 |
| Alkoxylate | 0.4970 |
| Acrylamide (50 wt %) | 21.7896 |
| $H_2O$ | 9.0709 |
| ACS | 8.0702 |
| AETAC (80 wt %) | 9.0790 |
| Brine (26.4 wt %) | 31.6743 |
| SMBS Solution (0.15%) | 0.9337 |
| Peroxide | 0.0016 |
| Inverting Surfactant | 0.8102 |
| Total | 100.0000 | water-in-oil emulsion composition) used are shown in Table 1. Preparation typically included combining some or all of deionized water, AM, MAPTAC, DADMAC, AETAC, $NH_4Cl$, EDTA, $H_2SO_4$ and mixing until homogenous to form the aqueous phase. The oil phase was prepared by mixing hydrophobic liquid with the indicated surfactants and stirring until blended. The pH of the aqueous phase was adjusted and it was then added to the oil phase and stirred to form a dispersion.

The dispersion was stirred under a nitrogen purge for 30 minutes and heated to the appropriate initiation temperature. At this stage, 20 microliters of peroxide was added to the reaction vessel followed by 0.075% sodium metabisulfite (SMBS) being fed at 0.1 mL/min. Upon initiation of exotherm, the reaction temperature was allowed to reach 50 degrees Celsius and controlled between 48-50° C. for the Example 2

Friction Flow Loop Testing

A friction flow loop was constructed from 5/16 inch inner diameter stainless steel tubing, approximately 30 feet in overall length. Test solutions were pumped out of the bottom of a tapered 5 gallon reservoir. The solution flowed through the tubing and was returned back into the reservoir. The flow was achieved using a plunger pump equipped with a variable speed drive. Pressure was measured from two inline gages, with the last gage located approximately 2 feet from the discharge back into reservoir.

Four gallons of brine solution (weight percent of salt indicated below) was prepared in the sample reservoir and the pump was started and set to deliver a flow rate of 5-10 gal/min. The salt solution was recirculated until the temperature equilibrated at 25° C. and a stabilized pressure differential was achieved. This pressure was recorded as the "initial pressure" of the brine solution. The test amount of neat water-in-oil emulsion polymer was quickly injected with a syringe into the sample reservoir containing the brine solution and a timer was started. The dose was recorded as gallons of water-in-oil emulsion per thousand gallons of brine solution (gpt). The pressure was recorded at 30 seconds, 1 min, 2 min and 3 min respectively. The pressure drop was calculated at each time interval comparing it to the initial pressure differential reading of the brine solution. The percentage friction reduction was determined as described in U.S. Pat. No. 7,004,254 at col. 9, line 36 to col. 10, line 43. The results are shown below in Table 2. Dose is the amount of water-in-oil emulsion used as gallons per thousand gallons of brine solution.

TABLE 2

Friction Reduction Performance.

| Row No. | Product | Dose (gpt) | Active % | Active Dosage wt % | 30 sec | 60 sec | 120 sec | 180 sec |
|---|---|---|---|---|---|---|---|---|
| 1 | 40/30/30 AM/AETAC/DADMAC | 1 | 25 | 0.25 | 69.5 | 68.9 | 68.3 | 67.7 |
| 2 | 40/30/30 AM/AETAC/DADMAC | 0.75 | 25 | 0.0189 | 68.7 | 68.1 | 66.4 | 64.4 |
| 3 | 40/30/30 AM/AETAC/DADMAC | 1 | 10 | 0.01 | 65.2 | 62.7 | 58.2 | 55.1 |
| 4 | 60/10/10/20 AM/AETAC/MAPTAC/DADMAC | 1 | 25 | 0.25 | 66.5 | 67.1 | 67.7 | 67.7 |
| 5 | 60/10/10/20 AM/AETAC/MAPTAC/DADMAC | 0.75 | 25 | 0.0189 | 62.2 | 64.6 | 65.6 | 65.2 |
| 6 | 60/10/10/20 AM/AETAC/MAPTAC/DADMAC | 1 | 10 | 0.01 | 62.7 | 62.7 | 60.1 | 57 |
| 7 | 60/40 AM/AETAC | 1 | 18.5 | 0.0185 | 67.9 | 69 | 69.6 | 69.6 |
| 8 | 60/40 AM/AETAC | 0.75 | 18.5 | 0.0014 | 64.9 | 66.1 | 66.1 | 66.1 |

The data show several trends. Compositions according to the present disclosure unexpectedly provide similar or equivalent performance to compositions having higher polymer loadings. For example, the composition referenced in Table 2 at Row No. 2 contains a lower loading of polymer than the composition at Row No. 1. Surprisingly, the composition in Row No. 2 is comparable to that of Row No. 1. Similarly, the performance of the composition in Row No. 5 (lower polymer loading) is comparable to that of the composition in Row No. 4 (higher polymer loading).

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A water-in-oil emulsion having an oil phase (0) and an aqueous phase (A) at an O/A ratio of from about 1:8 to about 10:1;
   wherein the water-in-oil emulsion includes the oil phase as a continuous phase comprising an inert hydrophobic liquid, and the aqueous phase as a dispersed phase of distinct particles in the oil phase comprising water, a water soluble polymer, and at least one surfactant;
   wherein the water soluble polymer consists of from 40 to 60 weight percent of (meth)acrylamide and from 40 to 60 weight percent of cationic monomers selected from the group consisting of (meth)acryloyloxyethyl trimethylammonium chloride (AETAC); (meth)acryloyloxyethyl trimethylammonium chloride (AETAC) and diallyldimethylammonium chloride (DAD MAC); (meth)acryloyloxyethyl trimethylammonium chloride (AETAC) and (meth)acrylamidopropyltrimethylammonium chloride (MAPTAC); and (m eth)acryloyloxyethyl trimethylammonium chloride (AETAC), diallyldimethylammonium chloride (DADMAC) and (meth)acrylamidopropyltrimethylammonium chloride (MAPTAC), wherein the amount is by total weight of the water-soluble polymer;
   wherein the water soluble polymer is present in an amount from about 5 to about 40 weight percent of the water-in-oil emulsion; and wherein an aqueous solution prepared by inverting the water-in-oil emulsion by adding it to water has at least comparable viscosity build to an aqueous solution made from a water-in-oil emulsion of the same composition containing 15 weight percent more water soluble polymer.

2. The water-in-oil emulsion according to of claim 1, wherein the water soluble polymer has a molecular weight in the range of from about 1,000,000 to about 20,000,000.

3. The water-in-oil emulsion according to claim 1, wherein the polymer has a reduced viscosity, as determined in a Ubbelhhde Capillary Viscometer at 0.05% by weight concentration of the polymer in 1M NaCl solution, at 30° C., pH 7, of from about 5 to about 40 dl/g.

4. The water-in-oil emulsion according to claim 1, wherein the water-in-oil emulsion comprises ammonium salt, 4-methoxyphenol, and an ethoxylated $C_{12}$-$C_{16}$ alcohol; and wherein the inert hydrophobic liquid comprises a mixture of paraffinic hydrocarbons and napthenic hydrocarbons; and wherein the surfactants comprise a tall oil fatty acid diethanol amine, a polyoxyethylene (5) sorbitan monooleate, and a sorbitan monooleate.

5. A method of treating a portion of a subterranean formation comprising the steps of:
   (a) providing the water-in-oil emulsion of claim 1;
   (b) inverting the water-in-oil emulsion by adding it to water at from about 0.1 to about 5 gallons of water-in-oil emulsion per thousand gallons of water to form a friction reducing treatment solution containing from about 0.0005 weight percent to about 0.12 weight percent water soluble polymer based on the weight of the treatment solution; and
   (c) introducing the treatment solution into the portion of the subterranean formation.

6. The method of claim 5, wherein the friction reducing treatment solution is introduced into the portion of the subterranean formation at a rate and pressure sufficient to create or enhance one or more fractures in the portion of the subterranean formation.

7. The method of claim 5, wherein the water-in-oil emulsion further comprises at least one additive selected from the group consisting of inhibitors, salts, inverting surfactants, and combinations thereof.

8. The method of claim 5, wherein the water-in-oil emulsion comprises ammonium salt, 4-methoxyphenol, and an ethoxylated $C_{12}$-$C_{16}$ alcohol; and wherein the inert hydrophobic liquid comprises a mixture of paraffinic hydrocarbons and napthenic hydrocarbons; and wherein the surfactants comprise a tall oil fatty acid diethanol amine, a polyoxyethylene (5) sorbitan monooleate, and a sorbitan monooleate.

9. The method of claim 5, wherein the water-in-oil emulsion is present in the friction reducing treatment solution in an amount in the range of from about 0.1 to about 3 gallons of water-in-oil emulsion per thousand gallons of 2% KCl solution (gpt).

* * * * *